(12) United States Patent
Sengupta et al.

(10) Patent No.: US 8,356,606 B2
(45) Date of Patent: Jan. 22, 2013

(54) PRODUCTION OF MICRONIZED ENCAPSULATED TOBACCO PARTICLES FOR TOBACCO FLAVOR DELIVERY FROM AN ORAL POUCH

(75) Inventors: Tapashi Sengupta, Barrington, IL (US); Munmaya K. Mishra, Richmond, VA (US); William R. Sweeney, Richmond, VA (US); Douglas A. Fernandez, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 725 days.

(21) Appl. No.: 12/155,227

(22) Filed: May 30, 2008

(65) Prior Publication Data

US 2009/0014018 A1    Jan. 15, 2009

Related U.S. Application Data

(60) Provisional application No. 60/924,826, filed on Jun. 1, 2007.

(51) Int. Cl.
*A24B 15/00* (2006.01)
(52) U.S. Cl. .................... 131/309; 131/290; 131/352
(58) Field of Classification Search .................. 131/309, 131/290, 352
See application file for complete search history.

(56) References Cited

U.S. PATENT DOCUMENTS

| | | |
|---|---|---|
| 1,234,279 A | 7/1917 | Buchanan |
| 1,376,586 A | 5/1921 | Schwartz |
| 3,111,127 A | 11/1963 | Jarboe |
| 3,435,829 A | 4/1969 | Hind et al. |
| 4,018,233 A | 4/1977 | Miyake |
| 4,109,663 A | 8/1978 | Maeda et al. |
| 4,276,312 A * | 6/1981 | Merritt ............................ 426/96 |
| 4,446,165 A | 5/1984 | Roberts |
| 4,515,769 A | 5/1985 | Merritt et al. |
| 4,789,516 A | 12/1988 | Lim |
| 4,806,356 A | 2/1989 | Shaw |
| 4,861,627 A | 8/1989 | Mathiowitz et al. |
| 5,104,674 A | 4/1992 | Chen et al. |
| 5,186,185 A | 2/1993 | Mashiko et al. |
| 5,370,139 A | 12/1994 | Shu et al. |
| 5,525,351 A | 6/1996 | Dam |
| 5,692,525 A | 12/1997 | Counts et al. |
| 5,725,865 A | 3/1998 | Mane et al. |
| 5,752,529 A | 5/1998 | Mane et al. |

(Continued)

FOREIGN PATENT DOCUMENTS

EP    1 371 410 A1    12/2003

(Continued)

OTHER PUBLICATIONS

International Search Report and Written Opinion mailed Jul. 15, 2009 for PCT/IB2008/002533.

(Continued)

*Primary Examiner* — Richard Crispino
*Assistant Examiner* — Dionne Walls Mayes
(74) *Attorney, Agent, or Firm* — Buchanan Ingersoll & Rooney PC

(57) ABSTRACT

A method of providing a comestible plant material taken orally by coating a micronized plant material with a first layer of polysaccharides or proteins, then a second layer of polysaccharides or proteins is disclosed. A bi-encapsulated plant material produced by this process is also disclosed.

9 Claims, 2 Drawing Sheets

U.S. PATENT DOCUMENTS

| | | | |
|---|---|---|---|
| 5,788,991 A | 8/1998 | Nastke et al. | |
| 5,827,531 A | 10/1998 | Morrison et al. | |
| 5,962,662 A | 10/1999 | Shu et al. | |
| 6,323,306 B1 | 11/2001 | Song et al. | |
| 6,325,859 B1 | 12/2001 | De Ross et al. | |
| 6,428,624 B1 | 8/2002 | Coleman, III et al. | |
| 6,458,404 B1 | 10/2002 | Adachi | |
| 6,676,959 B1 | 1/2004 | Andersson et al. | |
| 6,703,062 B1 | 3/2004 | Appleqvist et al. | |
| 6,845,777 B2 | 1/2005 | Pera | |
| 6,884,906 B2 | 4/2005 | Dewis et al. | |
| 7,032,601 B2 | 4/2006 | Atchley et al. | |
| 2003/0070687 A1 | 4/2003 | Atchley et al. | |
| 2004/0101543 A1 | 5/2004 | Liu et al. | |
| 2004/0118422 A1 | 6/2004 | Lundin et al. | |
| 2005/0000528 A1 | 1/2005 | Bereman | |
| 2005/0061339 A1 | 3/2005 | Hansson et al. | |
| 2005/0067726 A1 | 3/2005 | Yan et al. | |
| 2005/0172976 A1 | 8/2005 | Newman et al. | |
| 2005/0244521 A1 | 11/2005 | Strickland et al. | |
| 2005/0260266 A1 | 11/2005 | Gebreselassie et al. | |
| 2006/0090769 A1 | 5/2006 | Woodson et al. | |
| 2006/0165990 A1 | 7/2006 | Curtis et al. | |
| 2006/0191548 A1 | 8/2006 | Strickland et al. | |
| 2007/0000505 A1 | 1/2007 | Zhuang et al. | |
| 2007/0082094 A1* | 4/2007 | McClements et al. | 426/302 |
| 2007/0186941 A1 | 8/2007 | Holton, Jr. et al. | |
| 2009/0014018 A1 | 1/2009 | Sengupta et al. | |
| 2009/0301505 A1 | 12/2009 | Liu et al. | |

FOREIGN PATENT DOCUMENTS

| | | |
|---|---|---|
| WO | WO03/028492 A1 | 4/2003 |
| WO | WO 2007/073188 A1 | 6/2007 |
| WO | WO2008/075945 A | 6/2008 |

OTHER PUBLICATIONS

Turgeon, S.L. et al., "Protein-polysaccharide complexes and coacervates", Current Opinion in Colloid and Interface Science, London, GB, vol. 12, No. 4-5, Oct. 1, 2007, pp. 166-178.

Fanny Chantal Jacqueline Weinbreck, Whey protein/polysaccharide coacervates: structure and dynamics, Feb. 22, 1977, Thesis Utrecht University, The Netherlands, NIZO food research, Ede, The Netherlands, Ponsen & Looijen, Wageningen, ISBN 90-393-3672-5.

Pack Aroma Flavor Encapsulation, legacy.library.ucsf.edu/tid/skt6300/pdf.

* cited by examiner

PRODUCTION OF MICRONIZED ENCAPSULATED TOBACCO PARTICLES FOR TOBACCO FLAVOR DELIVERY FROM AN ORAL POUCH

CROSS REFERENCE TO RELATED APPLICATION

This application claims priority under 35 U.S.C. §119(e) to U.S. provisional Application No. 60/924,826, filed on Jun. 1, 2007, the entire content of which is incorporated herein by reference.

BACKGROUND

It is often desirable to coat plant materials for use in orally utilized compositions in order to improve the acceptability of the product to the consumer. There exists a need for such a coating to improve the "mouth feel," taste, texture, appearance, smell, flavor and flavor delivery or other attributes of the plant material, and thereby make the product more acceptable to the user.

In particular, there exists a need to encapsulate plant materials, such as smokeless tobaccos, including chewing tobacco, dry snuff and moist snuff. Some users of chewing tobacco and/or snuff compositions notice certain negative flavor characteristics associated with bitterness, astringency, acridness, tobacco flavor, and aftertaste; thus there is perceived a need to treat the compositions with a variety of flavors to overcome the negative taste characteristics sometimes associated with them.

SUMMARY

In one embodiment, a method is provided for preparing coated particles of finely-ground plant material, comprising:
  combining particles of finely ground plant material and a first polymeric coating material in a liquid medium, wherein the first polymeric coating material adsorbs onto at least a portion of a surface of the particles to form a first layer,
  mixing a second polymeric coating material with the liquid medium, wherein the second polymeric coating material adsorbs onto at least a portion of a surface of the first layer to form a second layer, thereby forming the coated particles and a depleted liquid medium.

In another embodiment, a method is provided for preparing coated particles of plant material which comprises
  dissolving a first polymeric coating material in a liquid medium to form a first mixture, and optionally adjusting the pH of the first mixture;
  dispersing a colloidal plant material in the first mixture to form a second mixture containing particles of plant material at least partially coated with a first coating material, and optionally adjusting the pH of the second mixture;
  dispersing a second polymeric coating material in the second mixture to form a third mixture containing particles of plant material at least partially coated with a second coating material,
  adjusting the temperature of the third mixture and optionally adjusting the pH of the third mixture, to induce gelation of the coated particles of plant material; and
  removing liquid from the third mixture to form coated particles of plant material.

In another embodiment, a coated particle of plant material prepared by these processes is provided.

In another embodiment, there is provided a coated particle of plant material which comprises
  a base particle of finely-ground plant material;
  a first polymeric coating material at least partially coating the base particle, said first coating material being selected from the group consisting of proteins, cationic polysaccharides or oligosaccharides, non-ionic polysaccharides or oligosaccharides, and mixtures of them,
  a second polymeric coating material at least partially coating the first coating, said second coating material being selected from polysaccharides, proteins, a mixture of polysaccharides, a mixture of proteins, or a mixture of polysaccharides and proteins.

A finely ground particle of a plant material, preferably a colloidal, comestible plant material is encapsulated with at least two coatings is provided by the process and products disclosed herein, which allows the coated particles, when placed in an oral cavity, to deliver the desired attributes of the encapsulated material in a predetermined fashion.

DETAILED DESCRIPTION

The Plant Material

Figure 1:
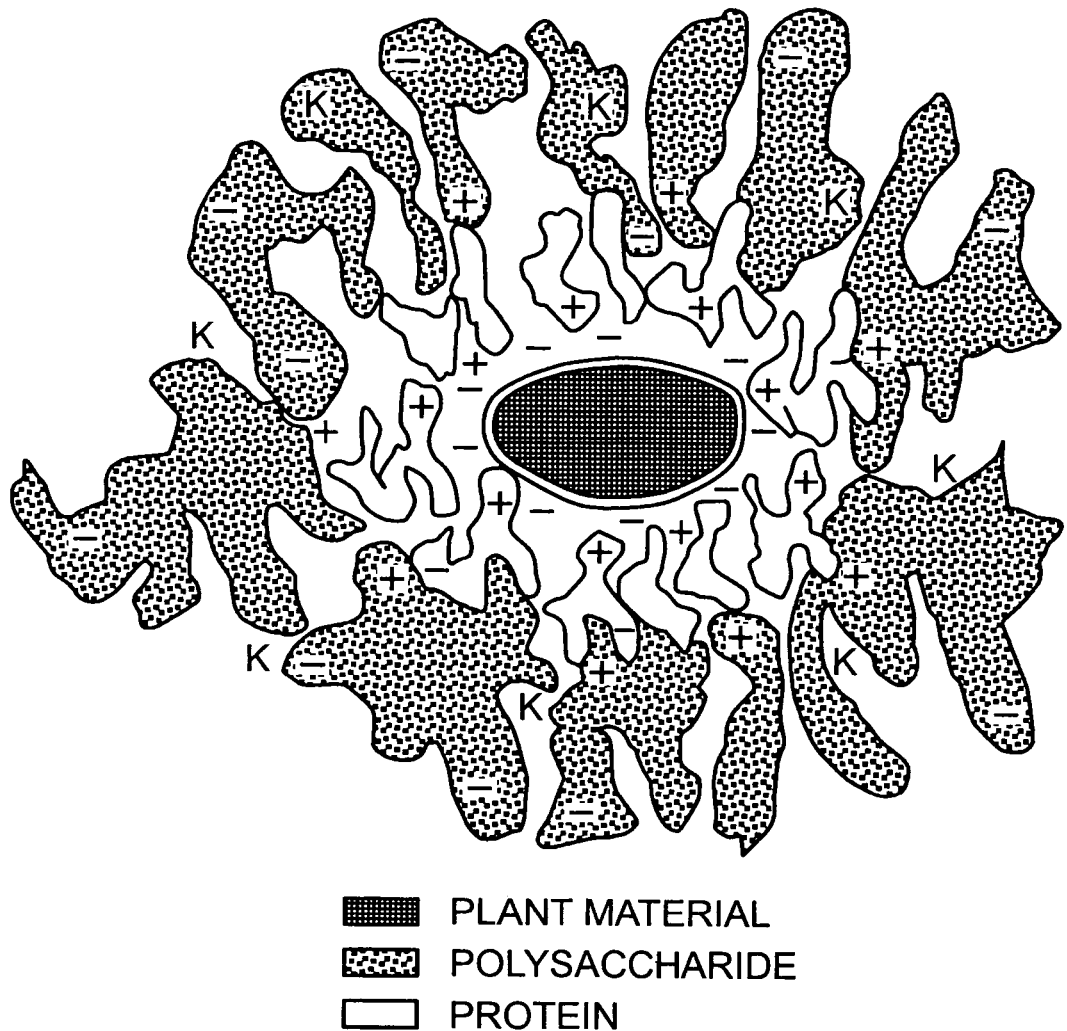
FIG. 1 is a cross-sectional depiction of a preferred embodiment of a particle of plant material with two coatings.

The plant material to be coated may be any ground plant material such as leafy botanicals, seeds, nuts or roots, or derivatives thereof, especially those desired to be taken orally, e.g., as a consumable food product or medicinal. The terms "derived from" and "derivative" are intended to include any materials obtained by processing of the plant itself, or by processing of products produced from the plant, such as extracts, powders, etc. In particular, the plant material may include or be derived from a leafy botanical, such as tea, tobacco (e.g., bright, burley, oriental, or mixtures of them), mint, or any other leafy botanicals, and combinations thereof. The plant material is not limited to the leafy portions thereof, however, and may include stems, flowers, fruits, and the like. The plant material may also include plant seeds, nuts, beans, roots, and the like, such as coffee or cocoa and derivatives thereof, as well as combinations of these, or other extracts or powders.

The starting plant material will be treated to form particles of small size, such as by grinding with a ball mill or using a homogenizer, such as homogenizers used in the art to form small particles, such as homogenizers manufactured by Microfluidics Corporation. Preferably, the plant material is ground until the particles of plant material are micronized, i.e., they have an effective cross section measured in microns. Preferably, the particles of plant material will have a cross section less than about 1000 microns, and typically between about 0.2 and about 250 microns, more particularly between about 1 and about 100 microns. The particles can have any desired shape, such as different regular and irregular shapes. Suitable regular shapes include round, square, rectangular, oval, other polygonal shapes, cylindrical, fibrous, and the like.

The ground plant material is typically either charged, Zwitterionic or neutral. If the ground plant material does not have the desired innate charge for attracting the first polymeric coating material, the plant material may be treated to alter the charge before being mixed with the first polymeric coating layer.

First Polymeric Coating

The first polymeric coating material may be selected from the group consisting of proteins (including hydrolyzates), cationic polysaccharides or oligosaccharides, non-ionic polysaccharides or oligosaccharides, and mixtures of them. It is desirable to select a first coating material that has a charge that will be attracted to the charge possessed by the ground plant material.

In one aspect there is provided a coated particle of plant material which comprises a base particle of finely-ground plant material which can be charged or neutral, a first polymeric coating material coating at least a portion of, and preferably all of, the base particle and a second polymeric coating material disposed at least partially on said first coating material. The first coating material can be neutral, Zwitterionic or ionic, preferably cationic. The first coating material is preferably selected from the group consisting of proteins (including protein hydrolyzates), cationic polysaccharides, cationic oligosaccharides, non-ionic polysaccharides, non-ionic oligosaccharides, and mixtures of them. The second coating material can also be ionic, Zwitterionic or neutral.

The first polymeric coating material may comprise (i) a protein or protein hydrolyzate, especially a Zwitterionic or cationic protein in the case where the plant material is negatively charged, (ii) a cationic polysaccharide, or preferably a cationic polysaccharide selected from the group consisting of chitosan, quaternary cellulosic polymers, modified cationic polysaccharides, polyquat-4, amidated pectins, and amidated or cationically modified starches, especially when the plant extract is negatively charged, or (iii) non-ionic polysaccharide, a polyvinyl pyrrolidone, a poly vinyl alcohol, or combinations thereof. If the first coating material is a non-ionic polysaccharide, it may be selected from the group consisting of modified starches, or methyl cellulose and derivatives thereof, including hydroxyl propyl methyl cellulose, propylene glycol ester of alginic acid, agar, curdlan, and modified pectins, such as those of citrus, apple, plum, gooseberry, or tobacco plant origin. Combinations of two or more of these materials may be used.

If the first polymeric coating material is a protein, it may be a plant-based or animal-based protein, and preferably is, or is derived from, a milk protein, a fish gelatin, a whey protein, an egg white protein, a rice protein, a soy protein, a wheat protein, a tobacco protein or a protein fraction from a tobacco plant, a protein from or derived from tobacco extract, or combinations thereof, a gelatin other than fish gelatin, corn protein, or protein hydrolyzates, or the protein may contain a high content of amino acid groups with a nitrogen-containing (preferably non-cyclic) side chain, such as lysine, asparagine, glutamine and arginine, which are beneficial for cross linking with carbohydrate carboxylic groups under processing conditions. Gelatins other than fish gelatin include beef gelatin, pork gelatin and gelatin hydrolyzates. Fish gelatin, for example, can be produced by comminution of the minced flesh of any of several species of lean fish, e.g., haddock, cod, cusk, cat and ocean perch. During comminution a small amount of sodium chloride may be added to improve the texture of the finished fish gelatin product.

If an allergen-free product is desired, it is preferred to employ protein derived from fish gelatin, rice protein, oat protein, or corn protein, or their hydrolyzates. It is preferable that the proteins be relatively pure and not treated or "instantized" with surfactants. It may also be preferable to treat the protein or protein hydrolyzate coating with an acid to impart a positive charge to facilitate electrostatic complexation between the protein and a subsequent coating comprising a polysaccharide/oligosaccharide The first polymeric coating may have a molecular weight between about 2 KDaltons and about 1000 KDaltons, or preferably between about 15 KDaltons and about 500 KDaltons.

Second Polymeric Coating

The second polymeric coating material is adsorbed over at least a portion of, and preferably all of, the first coating; the second coating material may be ionic, Zwitterionic or neutral. More particularly, the second polymeric coating material preferably comprises an anionic, Zwitterionic or neutral polysaccharide, a protein (including hydrolyzates), a mixture of polysaccharides, or a mixture of one or more polysaccharides and one or more proteins. The second polymeric coating material may have a molecular weight between about 5 KDaltons and about 1,000 KDaltons, preferably between about 100 KDaltons and about 500 KDaltons, more preferably between about 200 KDaltons and about 500 KDaltons.

If the second coating material is an anionic or Zwitterionic polysaccharide, it is preferably selected from at least one of carrageenan, gum arabic, carboxymethyl cellulose, pectins, such as those from citrus, apple, plum, gooseberry or tobacco plant origin, sodium alginate, gum tragacanth, locust bean gum, gellan gum, and xanthan gum.

If the second coating is a nonionic polysaccharide, it is preferably selected from the group consisting of modified starches, methyl cellulose and derivatives of it, hydroxy propyl methyl cellulose, propylene glycol ester of alginic acid, agar, curdlan, and modified pectins of citrus, apple, plum, gooseberry or tobacco plant origin (where the pectins have been modified to be non-ionic.

If the second coating is a protein, it may be either plant or animal based, and is preferably derived from milk protein, whey protein, egg white protein, soy protein, rice protein, wheat protein, tobacco protein fractions from tobacco plants or tobacco extracts, fish gelatin, gelatin other than fish gelatin, corn protein, or protein hydrolyzates. If it is desired to provide allergen-free products, the protein may be derived from rice, fish gelatin, oat protein, corn protein or their hydrolyzates. The protein preferably has a net negative or neutral charge under solution pH.

The polysaccharide used as a coating preferably should be substantially free of salts, sugars or hemicelluloses, (e.g., compounds with a molecular weight of between about 1 KDaltons to about 5 KDaltons), and should be preferably non-standardized.

Preferably, at least one of the polysaccharides or proteins in the second polymeric coating can form a gel in the pH range of about 3 to about 9. Alternatively, or in addition, it is preferred that the second coating material further comprises one or more monovalent, divalent or trivalent cations such as potassium, calcium, magnesium, and iron, in the form of salts such as chloride, citrate, lactate or acetate salts, which may assist in forming salt bridges between the coating materials, particularly when the second coating material includes an anionic or neutral polysaccharide, a protein, a mixture of polysaccharides, or a mixture of polysaccharide and protein. Alternatively, or in addition, the proteins and polysaccharides of the second polymeric coating can gel as a result of crosslinking, hydrogen bonding, hydrophobic interactions, or electrostatic complexation, particularly among carboxylic groups of polysaccharides and amino groups of proteins, or vice versa.

If desired, the protein or protein hydrolyzate in the second polymeric layer can be converted to a positive charge to facilitate electrostatic complexation between the protein and the polysaccharide/oligosaccharide. The conversion of the protein to a relatively positive state may be affected by lowering the pH of the liquid medium with weak food grade organic acids such as acetic, adipic, fumaric, malic, lactic, tartaric and gluconic acids, and gluco delta lactone, or food grade inorganic acids such as strong hydrochloric acid.

Additional Polymeric Coatings

Additional coatings may be added to twice-coated particles by adding a cationic protein or a cationic or non-ionic polysaccharide to the liquid medium to form a third mixture containing plant material coated with more than two polymeric coatings. Any subsequent polymeric coating may be any of the materials used in the first or second coating materials, or mixtures of them, and the methods described herein for forming the first and second coatings can be used to prepare particles having additional coatings. For example, a third polymeric coating may be added by introducing a third polymeric coating material into the liquid medium prior to drying, so that the third polymeric coating material adsorbs onto at least a portion of the surface of the second layer. After the desired coatings have been applied, the coated particles can preferably be dried to moisture content of less than about 15% by weight water, or if desired, to a moisture content between about 2 and about 5% by weight water.

Gelation of Polymeric Coatings

In the preparation of the coated plant material, inducing gel formation may be accomplished by adjusting pH, and/or by:
(i) adding monovalent, divalent or trivalent cations to the liquid medium during or after addition of the second polymeric coating material;
(ii) heating the third mixture to a temperature of between about 60° C. and about 90° C. for about 1-3 hours;
(iii) refrigerating the third mixture at a temperature of between about 20° C. and about 0° C. for about 1 to about 48 hours;
(iv) removing at least part of the liquid medium from the third mixture by spray drying;
(v) removing at least part of the liquid medium from the third mixture by freeze drying; or
(vi) combinations of two or more of (i) to (v).

It is preferred that at least one of the polysaccharides or proteins may form a gel in the pH range of about 3 to about 9, and/or that monovalent, divalent or trivalent cations may be added to the liquid medium during or after addition of the second polymeric coating material to induce formation of the gel, particularly involving the second or final coating. Cations selected from the group consisting of potassium, calcium, magnesium and iron as chloride, citrate, lactate and acetate salts may be added to the liquid medium during or after addition of the second polymeric coating material to induce formation of the gel, e.g., via formation of salt bridges. As indicated herein, gelation may also be induced or aided by heating (e.g., to a temperature between about 60° C. and about 90° C. for about 10 to about 180 minutes) or cooling (e.g., to a temperature between about 20° C. and about 0° C. for about 1 to about 48 hours) of the gel.

Representative Particle Compositions

The coated particles may comprise (a) about 10% to about 90% by dry weight plant material, about 20% to about 1% by weight of the first polymeric coating material, and about 50% to about 5% by weight of the second polymeric coating material, or (b) about 20% to about 80% by dry weight plant material, about 30% to about 1% by weight of the first polymeric coating material, and about 60% to about 1% by weight of the second polymeric coating material, or (c) about 40% to about 70% by dry weight plant material, about 15% to about 5% by weight of the first polymeric coating material, and about 40% to about 15% by weight of the second polymeric coating material.

It may also be advantageous to add some additional components or other additives during the processing to affect the "mouth feel," taste, texture, appearance, smell, flavor and flavor delivery and other attributes of the plant material. One or more other components may be included in the coatings, including, but not limited to, the following: gum arabic, flavorants, colorants, sweeteners such as xylitol, bulking agents, fillers, anti-adherent compounds, dispersing agents, moisture absorbing compounds, warming agents, cooling agents and film-forming agents. Other food ingredients such as starches, polyols, oils, lipids, waxes, fats, fatty acids, glycerides etc., may be also added to the coating to enhance the mouth feel of the finished, dried product. Additives, such as physiological cooling agents, throat-soothing agents, spices, warming agents, tooth-whitening agents, breath-freshening agents, vitamins, minerals, caffeine, drugs and other actives may be included in any or all portions of the coatings. Such components may be used in amounts sufficient to achieve their intended effects.

When the appropriate final ingredients and moisture content have been achieved, the mixture can be thoroughly homogenized or otherwise processed before it is dried, such as spray dried or freeze dried, under appropriate conditions to provide a micronized coated powder, comprising of individual dried particles, or agglomerations of particles. For example, the coated particles can be dried to a moisture content of less than about 15% by weight water, or if desired, to a moisture content between about 2 and about 5% by weight water.

The final composition of the dried product may contain about 10% to about 98% (w/w) dry powder, and preferably at least about 85% (w/w) dry powder, and more preferably between about 95% to about 98% (w/w) dry powder. Protein composition may vary from about 20% to about 1% (w/w) respectively. Carbohydrate composition may vary from about 50% to about 5% (w/w) respectively. The remaining constituents may include acidifiers such as food grade citric acid or others known to the art, and salts. The particle size of the powder, if it is spray dried, can be anywhere from about 0.20 micron to about 2000 microns in size, preferably from about 0.25 micron to about 1000 microns, and more preferably from about 0.3 to about 250 microns, or from about 0.3 to about 100 microns. The coated particles described herein are such that they may have a net negative charge and a zeta potential value of about −5 mV to about −60 mV, more particularly from about −15 mV to about −40 mV, preventing excessive agglomeration of particles and a gritty texture.

The outermost layer may be preferentially optimized in terms of the swelling behavior and visco-elasticity under physiological pH and temperature conditions, for controlling the extraction kinetics of materials from the plant material. The release of selected compounds from the plant materials may be triggered by simple diffusion into saliva, or upon application of pressure by the tongue and teeth. For example, upon ordinary chewing or dipping of the product, the user will release flavorings or other attributes as hydration occurs.

The protein/polysaccharide coatings may be stable for a limited time, e.g., from about 10 to about 20 minutes under the influence of the enzymes in the saliva. The in-mouth time constant may be changed by selection of particular proteins/polysaccharides/oligosaccharides in the coatings.

Methods of Coating the Particle

In one embodiment a method is provided for preparing coated particles of finely-ground plant material, comprising:
combining particles of finely ground plant material and a first polymeric coating material in a liquid medium, wherein the first polymeric coating material adsorbs onto at least a portion of a surface of the particles to form a first layer,
mixing a second polymeric coating material with the liquid medium, wherein the second polymeric coating material adsorbs onto at least a portion of a surface of the first layer to form a second layer, thereby forming the coated particles and a depleted liquid medium.

In a particular embodiment of this method, the combining comprises adding either the particles of finely ground plant material, or a colloidal dispersion of the particles of ground plant material in a dispersing medium, to a dispersion of the first polymeric coating material in the first liquid medium to form a first mixture. The dispersing medium can be an aqueous medium, such as deionized water.

After the particles are coated, in a preferred embodiment, the method includes removing at least a portion of the depleted liquid medium, thereby forming dried coated particles.

The formation of the coatings typically involves the gelling of the first and/or second polymeric coating material. This may be accomplished by, e.g., adjusting the pH of the coating material or the surrounding liquid medium or both, adjusting the temperature of the coating material or the surrounding liquid medium, or both, introducing gelation agents, or a combination of these. The methods used for each coating material may be different.

The starting plant material after it has been ground or micronized is commonly a negatively-charged particle. However, if it is not innately negatively-charged, the ground plant material may be treated by addition of appropriate reagents, for example bases such as sodium carbonate, sodium bicarbonate or sodium hydroxide (such as lye), to impart a negative or neutral charge to the particles before they are mixed with the first polymeric coating material.

The suitably micronized plant material can be dispersed in a dispersing medium, preferably an aqueous medium, comprising deionized water, to form a colloidal dispersion of the plant material. The plant material dispersed in the dispersing medium can be added to a solution of the first coating material in the liquid medium to form the first-coated particle dispersed in the liquid medium. Alternatively, the micronized plant material can be added directly to the first coating material in the liquid medium, to form the first coated plant material dispersed in the liquid medium. The pH of either the dispersed plant material or the first coating material can be altered relative to the liquid medium, e.g., by adjusting the pH of the liquid medium, as desired to facilitate the electrostatic coating of the plant material by the desired coating. Suitable substances for adjusting the pH can be food-grade materials such as weak organic acids like acetic acid, adipic acid, fumaric acid, malic acid, lactic acid, tartaric acid, or gluconic acid, or mixtures of these, or by adding glucono delta lactone, or strong food grade hydrochloric acid, or by adding bases such as sodium carbonate, sodium bicarbonate or sodium hydroxide, or mixtures of these, for example.

The plant material coated with the first polymeric coating material is then contacted with a solution of a second polymeric coating material. Prior to adding the second polymeric coating material to the mixture containing the once-coated plant material, or before the once-coated plant material is added to the second polymeric coating material, the overall electrical charge of the first coating on the plant material can be altered by adjusting the pH of the liquid medium. Suitable substances for adjusting the pH are acids and bases, e.g., weak organic acids such as acetic acid, adipic acid, fumaric acid, malic acid, lactic acid, tartaric acid, gluconic acids and glucono delta lactone or strong food grade hydrochloric acid, or bases such as sodium carbonate, sodium bicarbonate or sodium hydroxide, for example. In one aspect, a first coating of a protein or protein hydrolyzate can be treated with an acid to facilitate electrostatic attraction of the second polymeric coating material.

The twice-coated plant material may be additionally coated with one or more of the substances used in the first and second polymeric coatings, with or without additional additives. The additional additives that may be employed to adjust the physiological characteristics of the final product and may be added just prior to the drying stage. For example, sweeteners like xylitol or solid sweeteners and solid flavors (encapsulated) can be added to the mix and homogenized further right before spray drying to avoid interacting with the gel formation. Other food ingredients such as starches, polyols, oils, lipids, waxes, fats, fatty acids, glycerides etc. may be also added to the formulation to achieve desirable characteristics in the final product. The coated particle may have a net negative or neutral charge.

At the stage of the final coating, a gel may be formed from the coating by cross linking the carboxylic groups of the polysaccharides and the amino groups of proteins. or vice versa under processing conditions of about 60° C. to about 90° C. for about 1 to about 3 hours, and preferably about 60° C. to about 80° C. for about 1 to about 1.5 hours. The gel may then be stabilized by refrigerating it at a temperature above the freezing point of the gel, and typically from about 20° C. to about 0° C., or from about 15° C. to about 5° C. for about 1 to about 60 hours, and preferably about 12 to about 48 hours, before drying it.

Exemplary Method for Making Coated Particles

A solution containing about 0.5 to about 2% (w/w) protein in deionized water is prepared. The ground plant material is dispersed in the protein solution. The pH is adjusted to within the range from about 3.5 to about 6 with citric acid, depending on the protein used. The selected second coating material is added to the mix in a powder or solution form and mixed thoroughly. The resulting mixture is heated at about 70° C. to about 80° C. for about 1 to about 2 hours, depending on the protein used. A salt may be added to the heated mix for proper gelation of the carbohydrate layer. Salts are preferably added to coacervates based on carrageenan, while pectin-based coacervate gels may or may not need any added salt. Suitable salts can include KCl, a mixture of KCl+calcium lactate or simply calcium lactate, depending on the type of carbohydrate used. Other salts of bivalent metals such as calcium chloride or calcium citrate (including magnesium salts) can be used as well. The coacervate gel is preferably refrigerated for about 12 to about 48 hours before being spray dried.

Drying the Coated Particles

Following contact of the coated plant material with the final coating material, the liquid content of the mixture containing the coated plant material can be adjusted as necessary for the drying method employed. If the liquid is to be removed, it may be separated by customary means, such as decanting or filtering. Alternatively, if the plant material is present in the form of a coacervate gel, water (preferably deionized) or other liquid can be added to the gel to achieve the desired consistency for spray drying or freeze drying. For example, the water content of the gel may be adjusted to contain about 2% w/w concentration of solids in suspension.

If spray drying is utilized, for example, the suspension of coated colloidal particles can be atomized from a liquid feed into a spray of droplets, wherein the droplets can be placed in contact with drying air to form dry coated plant material. As an alternative to spray drying, the coated plant material can be passed through a tunnel drier at about 90° C. to about 95° C. to flash off a majority of the liquid, then can be air dried at room temperature to form a final powder.

In another embodiment, there is provided a coated particle of plant material which comprises a base particle of finely-ground plant material, said base particle being electrically charged or neutral, a first polymeric coating material coating the base particle, said first coating material being (i) ionic, cationic, Zwitterionic or neutral, or (ii) selected from the group consisting of proteins (including protein hydrolyzates), cationic polysaccharides or oligosaccharides, non-ionic polysaccharides or oligosaccharides, and mixtures of them, or (iii) combinations of (i) and (ii), and a second polymeric coating material over the first coating, said second coating material being ionic or neutral in charge.

In another embodiment, there is provided a method for manufacturing a bi-encapsulated colloidal base particle wherein the base particle comprises a finely ground comestible plant material. More particularly, there is provided a method for preparing coated particles of finely-ground plant material, which comprises adding particles of finely-ground plant material, either as a powder or as a colloidal dispersion of charged or neutral particles of plant material dispersed in a liquid medium, preferably, an aqueous medium, to a liquid medium containing a dispersion of a first polymeric coating material, wherein the first polymeric coating adsorbs onto at least a portion of a surface of the particles to form a first layer on the particles, then adding a second polymeric coating material to the liquid medium, wherein the second polymeric coating adsorbs onto at least a portion of a surface of the first layer to form a second layer on the once-coated particles, and then removing at least a portion of the liquid medium to form coated particles.

In another embodiment, there is provided a method of preparing coated particles of plant material which comprises adding a micronized plant material to a liquid medium containing a first polymeric coating material comprising at least one of a protein (including a hydrolyzate), a Zwitterionic biopolymer, and a polysaccharide to form a first mixture containing plant material at least partially coated with a first polymeric coating; then adding to the first mixture a cationic protein or a cationic or anionic polysaccharide to form a second mixture containing plant material at least partially coated with a first and a second polymeric coating, and optionally adding to the second mixture a cationic protein or a cationic or non-ionic polysaccharide, or a flavorant compound to form a third mixture containing plant material at least partially coated with a first, second and optionally a third polymeric coating, and removing excess liquid from the second (or third) mixture to form coated particles of plant material.

In another embodiment, there is provided a method of preparing coated particles of plant material which comprises dissolving a first polymeric coating material in a liquid medium and if necessary, adjusting the pH of the resulting mixture to within a first predetermined range; dispersing a colloidal plant material in the medium, either as a dry particle or in the form of a colloidal dispersion, and if necessary adjusting the pH of the resulting mixture to within a second predetermined range; dispersing a second polymeric coating material in the medium and if necessary adjusting the pH of the resulting mixture to within a third predetermined range; optionally heating the resulting mixture at a temperature of up to the boiling point of water, preferably about 60° C. to about 90° C., for about 10 minutes to about 180 minutes or more; refrigerating the mixture at a temperature of down to about the freezing point of the liquid mixture, preferably about 20° C. to about 0° C., and more preferably from about 15° C. to about 2° C. for about 1 to about 48 hours, then removing excess medium to form dried coated particles of plant material.

Once dried, the coated colloidal plant material may be easily incorporated into a variety of different palatable or edible products, such as chewable or non-chewable edible forms, due to the neutral esthetic color of the coated particles. For example, an original plant having an unappealing physical color such as a dark brown, can be coated so that the coated plant material has a light beige color, making it more suitable for integration in neutral-colored edible systems.

In another embodiment, the coated plant material can be used as a palatable or comestible product for animal or human consumption, and it may be incorporated into a consumer product for oral application, such as in the form of a tablet, stick, chewable gum, spongy material, foam, cream, pelleted material, or fiber, or a form suitable to be contained in a pouch, or combinations of these.

Such a product may have a first polymeric coating on the particle which is stable in the mouth for about 1 to about 20 minutes. The extraction mechanics of the plant material in the mouth may be altered by altering one or more of the following characteristics of the polymeric coatings: swelling behavior, visco-elasticity under physiological pH and temperature conditions, porosity, stability or rate of diffusion of ingredients under application of pressure by tongue or teeth or both, stability from dissolution upon attack from enzymes in saliva, or combinations of these. Also, one or more of the following characteristics of the polymeric coatings can be optimized for controlling the mouth feel of the edible product: slipperiness, sliminess, firmness, sponginess, stability or rate of diffusion of ingredients under application of pressure by tongue or teeth or both, stability from dissolution upon attack from enzymes in saliva, or combinations of these. These properties can be varied by selecting different coating materials for the first and second coating polymers, combining different coating materials, modifying the properties of coating materials, e.g., by crosslinking, or combinations of these.

FIG. 1 is a schematic depiction of a coated particle formed by the method described herein. In the center 101 is a finely-ground particle of plant material, in this case tobacco, which has an overall negative charge. It is surrounded or encapsulated by a first protein coating material 102, in this case, calcium caseinate. The protein layer 102 is in turn surrounded or encapsulated by a polysaccharide 103, in this case κ-carrageenan. Potassium ions have been added to assist in formation of the gel.

Figure 2:
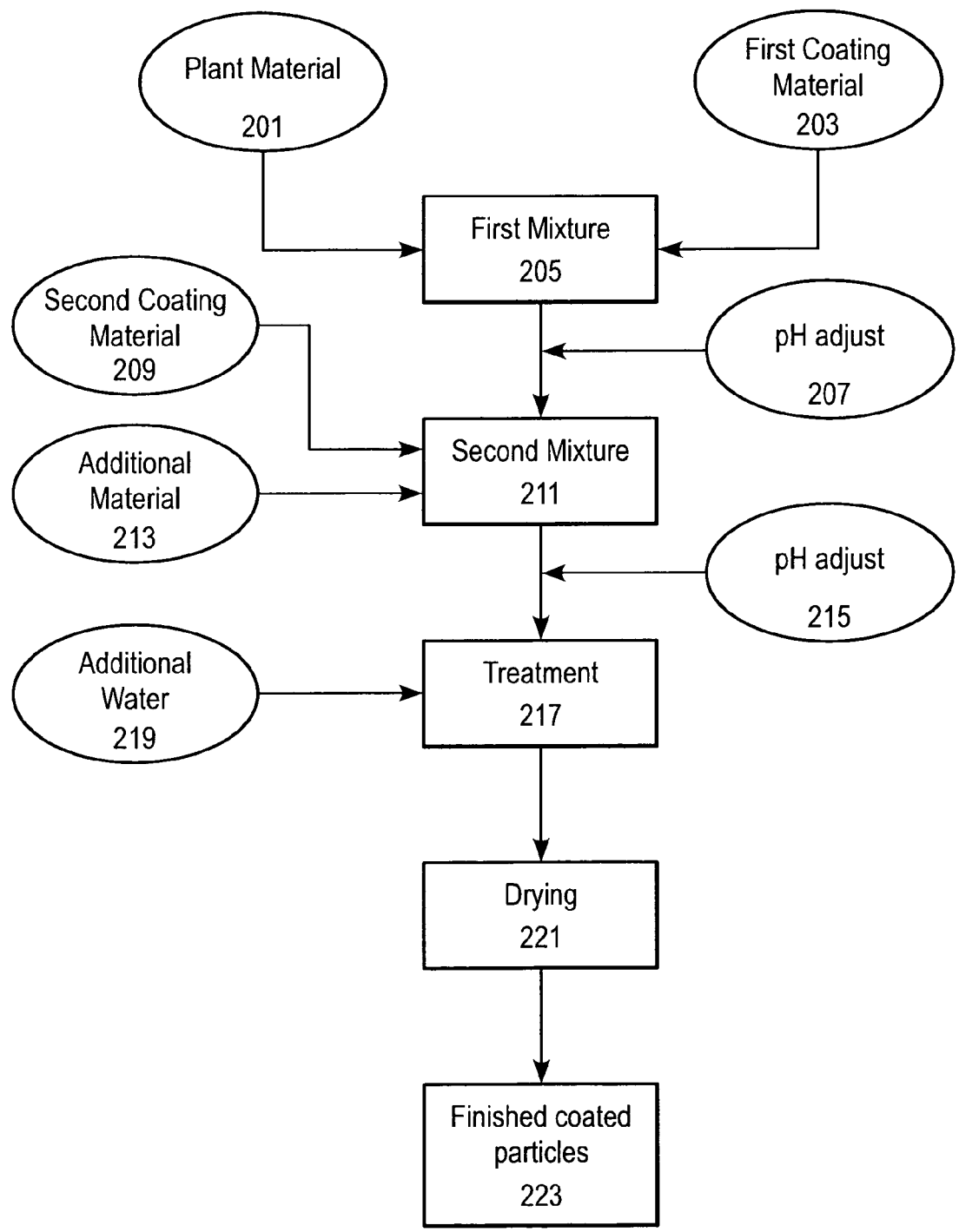
FIG. 2 is a flow chart of a preferred embodiment of a method for manufacturing the encapsulated particles of plant material.

FIG. 2 is a schematic depiction of one embodiment of the method of forming the coated particle. A micronized plant material 201 is combined with a first coating material 203 in a liquid medium to form a first mixture 205 of coated plant material. If needed, the first mixture 205 is treated to adjust the pH in 207 prior to the contact with the second coating material 209 to form a second mixture in 211. If desired, additional material 213 may be added to the second mixture to impart additional characteristics to the finished coated plant material, or to aid in gelation of the outer coating(s). The pH of the resulting material may be adjusted in 215 by addition of a suitable food-grade acid, base or salt. Water may be added in 219, or removed prior to conditioning of the gel, and again to prepare the gel for the drying step 221. Once suitably dried, the finished coated particles 223 can be utilized as is, or can be incorporated into other products.

EXAMPLES

Example 1

A suitably ground plant material is dispersed in a protein solution in deionized water, and the pH of the mixture is adjusted to within the range of 3.5 to 6 by adding citric acid. The second coating material, such as a carbohydrate in powder or solution form, is added and the resulting mixture is heated at about 70° C. to about 80° C. for about 1 hour to about 2 hours to form a coacervate gel. Depending on the protein used, a salt such as potassium chloride, calcium lactate, mixtures of them, or salts of bivalent metals such as calcium chloride, calcium citrate, or magnesium salts may be used. When one of the coatings is a carrageenan or other alginate, it may be preferable to add a salt to allow gellation of the mixture, whereas if the gel is pectin based, addition of a salt may not be needed. Coacervate gels may or may not need any added salt. The coacervate gel is refrigerated for about 12 hours to about 48 hours to condition it before spray drying. This procedure is repeated, with the indicated modifications, for each example given below.

Example 2

Ground Tea Powder Encapsulation: Basis 100 gm of Coacervate Gel

Na-caseinate—κ-carrageenan coacervate gel encapsulating tea powder.
Deionized water=89.34 gm.
Na-caseinate, low fat (from American Casein company)=0.89 gm.
Ball milled tea powder, average particle size 1 micron=4.47 gm.
0.5 M Citric acid solution (Sigma, 99% pure)=0-2.68 gm.
κ-carrageenan (FMC Biopolymers Gelcarin 911 NF)=2.23 gm.
0.5 M KCl (ACS grade, Fisher) solution=0.18 gm.
0.153 M Calcium lactate solution (Sigma, 90%)=0.20 gm.

Example 3

Ground Coffee Powder Encapsulation: Basis 100 gm of Coacervate Gel

Na-caseinate—κ-carrageenan coacervate gel encapsulating coffee powder
Deionized water=89.34 gm.
Na-caseinate, low fat (from American Casein company)=0.89 gm.
Ball milled coffee powder, 1 micron=4.47 gm.
0.5 M Citric acid solution (Sigma, 99% pure)=2.68 gm.
κ-carrageenan (FMC Biopolymers Gelcarin 911 NF)=2.23 gm.
0.5 M KCl (ACS grade, Fisher) solution=0.18 gm.
0.153 M Calcium lactate solution (Sigma, 90%)=0.20 gm.

Example 4

Tobacco Powder Encapsulation: Basis 100 gm of Coacervate Gel

Na-caseinate—κ-carrageenan coacervate gel encapsulating tobacco powder
Deionized water=83.42 gm.
Na-caseinate, low fat (from American Casein company)=0.83 gm.
400 mesh ground burley tobacco=5.84 gm.
0.5 M Citric acid solution (Sigma, 99% pure)=7.95 gm.
κ-carrageenan (FMC Biopolymers Gelcarin 911 NF)=1.67 gm.
0.5 M KCl (ACS grade, Fisher) solution=0.14 gm.
0.153 M Calcium lactate solution (Sigma, 90%)=0.15 gm.

Example 5

Tobacco Powder Encapsulation: Basis 100 gm of Coacervate Gel

Na-caseinate—i-carrageenan coacervate gel encapsulating tobacco powder
Deionized water=86.77 gm.
Na-caseinate, low fat (from American Casein company)=0.87 gm.
400 mesh ground burley tobacco=5.21 gm.
0.5 M Citric acid solution (Sigma, 99% pure)=4.07 gm.
i-carrageenan (FMC Biopolymers Gelcarin 379 NF)=2.6 gm.
0.153 M Calcium lactate solution (Sigma, 90%)=0.49 gm.

Example 6

Tobacco Powder Encapsulation: Basis 100 gm of Coacervate Gel

Gelatin—pectin coacervate gel encapsulating tobacco powder
Deionized water=86.96 gm.
Gelatin from Porcine skin, type A, 300 Bloom=0.87 gm.
400 mesh ground burley tobacco=6.09 gm.
0.5 M Citric acid solution (Sigma, 99% pure)=1.47 gm.
Citrus peel Pectin, 40% ester (CP Kelco Genu pectin LM-18-CG)=1.74 gm.
0.153 M Calcium lactate solution (Sigma, 90%)=2.87 gm.

Example 7

Tobacco Powder Encapsulation: Basis 100 gm of Coacervate Gel

Na-caseinate—pectin coacervate gel encapsulating tobacco powder
Deionized water=84.78 gm.
Na-caseinate, low fat (from American Casein company)=0.85 gm.
400 mesh ground burley tobacco=5.93 gm.

0.5 M Citric acid solution (Sigma, 99% pure)=6.74 gm.
Apple Pectin, 6% ester (Sigma)=1.70 gm.

Example 8

Tobacco Powder Encapsulation: Basis 100 gm of Coacervate Gel

Na-caseinate—pectin coacervate gel encapsulating tobacco powder
Deionized water=84.81 gm.
Na-caseinate, low fat (from American Casein company)= 0.85 gm.
400 mesh ground burley tobacco=5.94 gm.
0.5 M Citric acid solution (Sigma, 99% pure)=6.71 gm.
Amidated low ester pectin (Genu pectin X-916-02)=1.70 gm.

Example 9

Tobacco Powder Encapsulation: Basis 100 gm of Coacervate Gel

Chitosan—pectin coacervate gel encapsulating tobacco powder
Deionized water=82.03 gm.
Chitosan, medium viscosity (Vanson)=0.82 gm.
400 mesh ground burley tobacco=5.74 gm.
0.5 M Citric acid solution (Sigma, 99% pure)=9.61 gm.
Apple Pectin, 6% ester (Sigma)=1.80 gm.

Example 10

Tobacco Powder Encapsulation: Basis 100 gm of Coacervate Gel

Soy isolate—κ-carrageenan coacervate gel encapsulating tobacco powder
Deionized water=83.25 gm.
Soy isolate (Solae company, Supro EX-38)=0.83 gm.
400 mesh ground burley tobacco=5.83 gm.
0.5 M Citric acid solution (Sigma, 99% pure)=8.14 gm.
κ-carrageenan (FMC Biopolymers Gelcarin 911 NF)=1.66 gm.
0.5 M KCl (ACS grade, Fisher) solution=0.14 gm.
0.153 M Calcium lactate solution (Sigma, 90%)=0.15 gm.

Example 11

Tobacco Powder Encapsulation: Basis 100 gm of Coacervate Gel

Soy concentrate—κ-carrageenan coacervate gel encapsulating tobacco powder.
Deionized water=83.56 gm.
Soy concentrate (Solae company, Alpha 10)=0.84 gm.
400 mesh ground burley tobacco=5.85 gm.
0.5 M Citric acid solution (Sigma, 99% pure)=7.80 gm.
κ-carrageenan (FMC Biopolymers Gelcarin 911 NF)=1.67 gm.
0.5 M KCl (ACS grade, Fisher) solution=0.14 gm.
0.153 M Calcium lactate solution (Sigma, 90%)=0.15 gm.

Example 12

Tobacco Powder Encapsulation: Basis 100 gm of Coacervate Gel

Soy isolate—pectin coacervate gel encapsulating tobacco powder
Deionized water=84 gm.
Soy isolate (Solae company, Supro EX 38)=0.83-1.8 gm.
400 mesh ground burley tobacco=5.78 gm.
0.5 M Citric acid solution (Sigma, 99% pure)=6.58 gm.
Tobacco sourced pectin=1.87 gm.
0.153 M Calcium lactate solution (Sigma, 90%)=0-2.77 gm.

Example 13

Tobacco Powder Encapsulation: Basis 100 gm of Coacervate Gel

Tobacco sourced protein—κ-carrageenan coacervate gel encapsulating tobacco powder
Deionized water=87.05 gm.
Tobacco sourced protein, (Philip Morris Company)=0.87 gm.
400 mesh ground burley tobacco=6.16 gm.
0.5 M Citric acid solution (Sigma, 99% pure)=3.87 gm.
κ-carrageenan (FMC Biopolymers Gelcarin 911 NF)=1.76 gm.
0.5 M KCl (ACS grade, Fisher) solution=0.15 gm.
0.153 M Calcium lactate solution (Sigma, 90%)=0.15 gm.

Example 14

Tobacco Powder Encapsulation: Basis 100 gm of Coacervate Gel

Tobacco sourced protein—pectin coacervate gel encapsulating tobacco powder
Deionized water=86.13 gm.
Tobacco sourced protein, (Philip Morris Company)=0.86 gm.
400 mesh ground burley tobacco=6.10 gm.
0.5 M Citric acid solution (Sigma, 99% pure)=5.17 gm.
40% ester pectin (Genu pectin LM-18-CG-Z)=1.74 gm.

Example 15

Tobacco Powder Encapsulation: Basis 100 gm of Coacervate Gel

Na-caseinate—κ-carrageenan coacervate gel encapsulating ball milled DBC bright tobacco powder
Deionized water=83.42 gm.
Na-caseinate, low fat (from American Casein company)= 0.83 gm.
Ball milled DBC Bright tobacco, 1 micron=5.84 gm.
0.5 M Citric acid solution (Sigma, 99% pure)=7.95 gm.
κ-carrageenan (FMC Biopolymers Gelcarin 911 NF)=1.67 gm.
0.5 M KCl (ACS grade, Fisher) solution=0.14 gm.
0.153 M Calcium lactate solution (Sigma, 90%)=0.15 gm.

Example 16

Tobacco Powder Encapsulation: Basis 100 gm of Coacervate Gel

Na-caseinate—κ-carrageenan coacervate gel encapsulating tobacco powder processed via
Microfluidics Homogenizer
Deionized water=83.42 gm.
Na-caseinate, low fat (from American Casein company)= 0.83 gm.
400 mesh ground burley tobacco, processed via Microfluidics, ~15 micron=5.84 gm.
0.5 M Citric acid solution (Sigma, 99% pure)=7.95 gm.

κ-carrageenan (FMC Biopolymers Gelcarin 911 NF)=1.67 gm.
0.5 M KCl (ACS grade, Fisher) solution=0.14 gm.
0.153 M Calcium lactate solution (Sigma, 90%)=0.15 gm.

It will now be apparent to those skilled in the art that this specification describes a new, useful, and nonobvious coated colloidal plant material and a method for making the same. It will also be apparent to those skilled in the art that numerous modifications, variations, substitutes, and equivalents exist for various aspects of the detailed description above. Accordingly, it is expressly intended that all such modifications, variations, substitutions, and equivalents that fall within the spirit and scope of the appended claims, be embraced thereby.

What is claimed is:

1. A method for preparing particles of encapsulated micronized finely-ground tobacco suitable for placement in an oral pouch for the delivery of tobacco flavor, comprising:
   forming a colloidal dispersion of particles of negatively charged micronized finely ground tobacco in a liquid dispersing medium;
   combining the colloidal dispersion and a cationic first polymeric coating material in a liquid medium, wherein the first polymeric coating material adsorbs onto at least a portion of a surface of the tobacco particles to form a first layer, and
   mixing a second polymeric coating material with the liquid medium, wherein the second polymeric coating material adsorbs onto at least a portion of a surface of the first layer to form a second layer, thereby forming the coated tobacco particles and a depleted liquid medium,
   wherein the resulting encapsulated particles of micronized finely ground tobacco when present in a pouch within the oral cavity are capable of the diffusion of tobacco flavor from the tobacco contained therein upon the application of pressure by the tongue or teeth.

2. The method for preparing particles of encapsulated micronized finely-ground tobacco of claim 1, wherein the combining comprises adding the colloidal dispersion to a dispersion of the first polymeric coating material in the first liquid medium to form a first mixture.

3. The method for preparing particles of encapsulated micronized finely-ground tobacco of claim 1, further comprising removing at least a portion of the depleted liquid medium, thereby forming dried coated particles.

4. The method for preparing particles of encapsulated micronized finely-ground tobacco of claim 1, further comprising causing the first or second polymeric coating material to gel by adjusting its pH, adjusting its temperature, introducing gelation agents, or a combination thereof.

5. The method for preparing particles of encapsulated micronized finely-ground tobacco of claim 4, further comprising adjusting the pH of the first or second polymeric coating material on the coated particle by adding to the liquid medium an organic acid selected from the group consisting of acetic acid, adipic acid, fumaric acid, malic acid, lactic acid, tartaric acid, gluconic acid, and combinations thereof, by adding glucono delta lactone or hydrochloric acid, or by adding a base selected from the group consisting of sodium carbonate, sodium bicarbonate, sodium hydroxide, and combinations thereof.

6. The method for preparing particles of encapsulated micronized finely-ground tobacco of claim 4, wherein gelling of the first or second polymeric coating material results from adjusting the pH of the second polymeric material to between about 3 and about 9, from adjusting the temperature by heating the first or second polymeric coating material to a temperature of about 60° to about 90° C. for about 10 to about 180 minutes, or by cooling the first or second polymeric coating material from about 20° to about 0° C. for about 1 to about 48 hours, or from addition of a gelation agent comprising one or more salts of potassium, calcium, magnesium, or iron cations and chloride, citrate, lactate, or acetate anions.

7. The method for preparing particles of encapsulated micronized finely-ground tobacco of claim 1, further comprising adding a third polymeric coating material to the liquid medium, wherein the third polymeric coating material adsorbs onto at least a portion of a surface of the second layer, thereby forming a third layer.

8. The method for preparing particles of encapsulated micronized finely-ground plant material of claim 1, further comprising:
   (i) altering one or more of the following characteristics of the polymeric coatings to control the extraction mechanics of the tobacco flavor in the mouth: swelling behavior; visco-elasticity under physiological pH and temperature conditions; porosity; stability or rate of diffusion of tobacco flavor under application of pressure by tongue or teeth or both; stability from dissolution upon attack from enzymes in saliva, or combinations of these;
   (ii) optimizing one or more of the following characteristics of the polymeric coatings for controlling the mouth feel of the encapsulated micronized finely-ground tobacco: swelling behavior; visco-elasticity under physiological pH and temperature conditions; slipperiness or sliminess; firmness;
   sponginess; stability or rate of diffusion in the mouth upon application of pressure by tongue or teeth or both; stability from dissolution upon attack by enzymes in the saliva, or combinations of these; or
   (iii) both (i) and (ii).

9. The method for preparing particles of encapsulated micronized finely-ground tobacco of claim 1, wherein the second polymeric coating material is anionic.

* * * * *